May 31, 1932.  W. H. KING ET AL  1,860,809
MUNTING MACHINE
Filed Dec. 7, 1931  2 Sheets-Sheet 1
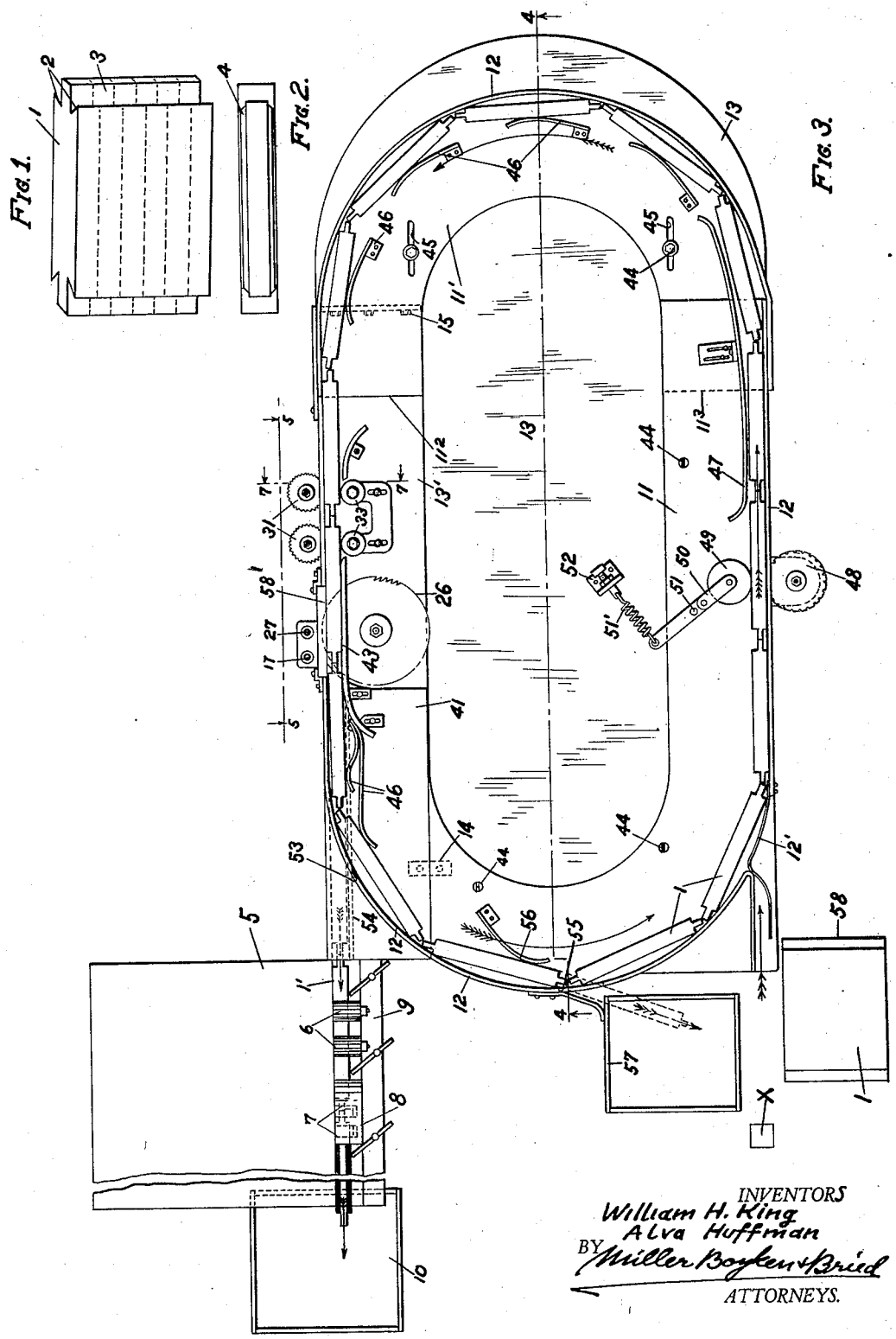
INVENTORS
William H. King
Alva Huffman
BY Miller Boyken+Bried
ATTORNEYS.

May 31, 1932.  W. H. KING ET AL  1,860,809
MUNTING MACHINE
Filed Dec. 7, 1931  2 Sheets-Sheet 2
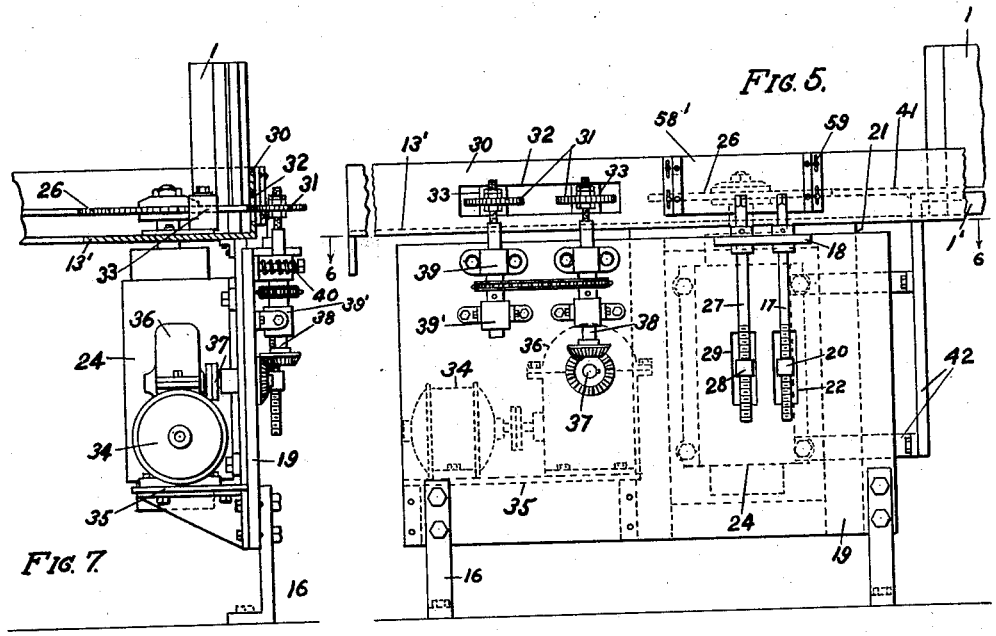
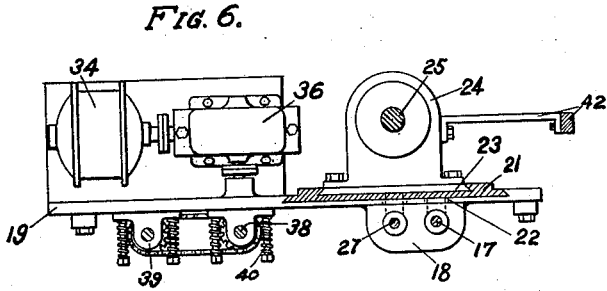
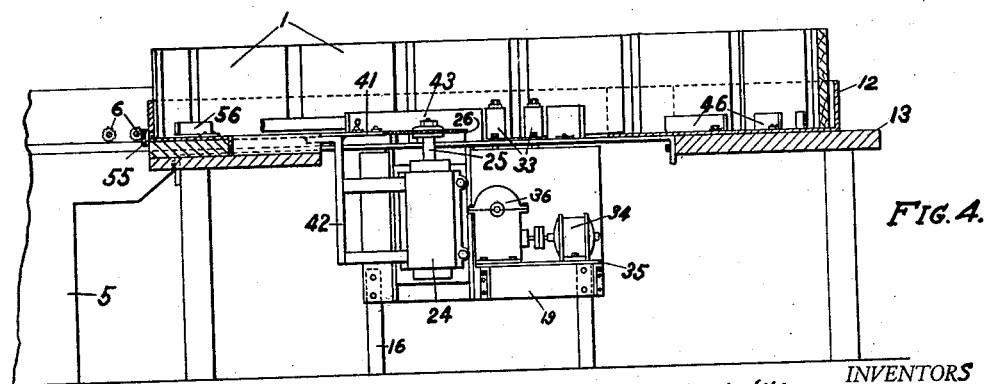
INVENTORS
William H. King
Alva Huffman
BY Miller, Boyken & Bried
ATTORNEYS.

Patented May 31, 1932

1,860,809

UNITED STATES PATENT OFFICE

WILLIAM H. KING AND ALVA HUFFMAN, OF WEED, CALIFORNIA

MUNTING MACHINE

Application filed December 7, 1931. Serial No. 579,445.

This invention relates to factory woodworking machinery and has for its objects improved machinery in combination with a sticker of ordinary construction for quickly producing muntings and the like.

In the drawings Fig. 1 is a perspective view of preformed wooden block which is fed to our combined machine.

Fig. 2 is a plan view of a finished munting as made from the block by our combined machine.

Fig. 3 is a plan view of the combined machine.

Fig. 4 is a somewhat reduced size vertical section of the machine of Fig. 3 as seen from the line 4—4 thereof.

Fig. 5 is a rear elevation of a portion of the machine as seen from the line 5—5 of Fig. 3.

Fig. 6 is a section of Fig. 5 along line 6—6 thereof.

Fig. 7 is a section of Fig. 3 along line 7—7 thereof.

In the manufacture of muntings it is the usual practice to cut the ends of a board or block of wood on a tenoning machine as shown in Fig. 1 wherein the block 1 has its ends cut inwardly at 2 in the required form to fit over the stile and bar mold to which it is to be coped, and it is provided with a tongue 3 which will form the mortice ends of the muntings. This block is then taken to a saw and sawed into strips along the dotted lines, the strips are then taken to a sticker and moldings run on one or both edges as shown at 4 in Fig. 2 which shows the completed munting.

Our invention comprises a machine which is secured to a sticker of ordinary construction, and the blocks 1 are fed into the machine to go around a continuous path of travel while supported on edge, and the machine cuts a strip from the lower edge of the blocks in succession and feeds the strips into the sticker knives. One man only is required to keep the machine filled with tenoned blocks, and since the machine takes a large number of blocks at a filling, this man has plenty of time to remove the finished product from the sticker as well as to feed the machine with blocks and remove the discharged waste strips.

In the drawings 5 indicates a conventional sticker with its horizontally positioned feed rolls at 6 and with the upper knives dotted at 7 under a protecting cover 8. As this part of the combination may be of any well known construction no further details will be given here, suffice to say that the cut-off strips 1' travel along the guide 9 of the sticker and after being formed along the edges with the mold are dropped into the chute or box 10.

The features of the invention consist in the cooperating balance of the machine as shown in Fig. 3 and which comprises an oval-shaped guide plate 11, 11' provided with an upstanding marginal rim 12, all supported on a fixed table or base 13, preferably detachably and adjustably secured at 14 and 15 to a work or saw table portion 13' which is in turn secured in any desired manner in fixed relation to the material guiding plate 9 of the sticker portion of the combination. This saw table portion 13' is supported on legs 16 and is arranged for vertical adjustment by means of screws 17 rotatably supported in a lug 18 projecting rearwardly from the rear side of a vertical plate 19 bolted rigidly to the legs 16. The lower end of the screw 17 passes through the threaded lug 20 projecting rearwardly from a vertically positioned guide plate 21 through a slot 22 in fixed plate 19, and the upper end of which guide plate 21 carries the saw table 13' so that as the screw is adjusted the guide plate as well as the saw table will be raised or lowered.

The forward face of sliding plate 21 which carries the saw table is itself formed with a vertical guiding recess in which is slidably positioned a motor bed plate 23 to which a vertically positioned electric motor 24 is bolted, and the shaft 25 of which motor carries a horizontally positioned circular saw 26 at its upper end spaced above the saw table a distance equal to the height of a mounting to be cut from block 1.

This motor and its saw may be vertically adjusted to any desired position by a screw 27 similarly mounted to screw 17 and threadedly engaging a lug 28 projecting from motor bed plate 23 through suitable slots 29 in both plate 21 as well as plate 19 as indicated in Fig. 5.

The saw table is provided with a vertical wall 30 corresponding to wall 12 of the oval guide and against which the blocks 1 to be operated on are guided while strips are cut from the lower portion of the blocks as the blocks are forced along by means of a pair of spaced feed rollers 31 working through an aperture 32 in wall 30 while the forward sides of the blocks bear against spaced idler rolls 33.

Feed rollers 31 are geared together by any suitable means as indicated in Fig. 5 and driven by a separate motor 34 mounted on a shelf 35 on the forward side of plate 19, the motor speed being reduced by means of any suitable speed reducing gear in casing 36 with its final slow speed shaft 37 geared direct to one of the feed roll shafts 38. The upper boxes 39 of the feed rolls may be resiliently mounted by means of springs 40 to permit slight resiliency of the feed rolls in pasing over knots, and the lower boxes 39' pivoted to suit. The feed rollers or spur disks 31 are also adjustable on their respective shafts between lock nuts, as shown, so as to lie in the same plane as the saw and any markings on the blocks consequently will be cut out by the saw.

In the plane of the saw and arranged to enter the kerf is a horizontally disposed splitter plate 41 carried by a bracket 42 secured to saw motor 24 so that as the saw is adjusted vertically the splitter plate will always follow.

In Fig. 5 the main part 1 of the block is shown passing off on top of the splitter and the sawed-off strip 1' below the plate to enter the sticker.

Idler rollers 33 are mounted as indicated in Fig. 3 for adjustment to thickness of blocks being sawed, and overlying the saw blade is an adjustably mounted inner guide 43 for the inner face of the blocks.

The oval-shaped guide around which the blocks travel is made of sheet metal secured to the top of table 13 as by screws 44 and is made in two sections 11 and 11', the latter being slidably adjustable in slots 45 and with its end 11² overlying the saw table 13' and its end 11³ underlying the end of section 11 as shown in Fig. 3 so that the inner distance around the oval-shaped path of travel of the blocks 1 can be adjusted to nicely receive a plurality of the blocks of various length blocks without slack so that one will push the other around the guide as the machine is run.

To steady the blocks several leaf springs 46 secured at one of their ends to plate 11 or 11' or other convenient member, bear at their free ends against the blocks 1 to hold them resiliently against the guiding wall 12. Also, where required, we may provide inner wall sections 47 preferably made of sheet metal and adjustably mounted on plates 11 or 11', and in addition we may provide a power drive roll at 48 operating through a slot in wall 12 against blocks 1, the blocks being held against the roll by means of a resiliently mounted idler 49, the resilient mounting of which idler comprises an arm 50 pivoted at 51 to the guide 11 and resiliently pulled in direction to force the roll 49 against the blocks by a spring 51' adjustably anchored to a lug 52 secured to the top of table 13 as shown in Fig. 3.

To permit the strips of the blocks as cut off by the saw to pass straight to the sticker and not go around the oval path, the vertical guiding wall 12 has an open slot in it at 53 high enough for the sawed stick to travel through it while the upper portions of the blocks are guided above the splitter plate 41 around the oval path and back to the saw. Preceding slot 53 and under the splitter 41 is a guide 54 which guides the cut-off strip through the opening 53 to pass it to the sticker.

As the strips are consecutively cut from the blocks the remainder of the blocks ride over the splitter plate 41 and onto plate 11 which is secured to and aligned to the splitter plate at this point, plate 11 gradually descending along the return run until it lies upon the end 11³ of section 11'.

When the blocks are about all used up there will usually be left a small strip of waste too small for a munting, and this will be pushed out of a slot in side wall 12 at 55 by means of a sufficiently narrow leaf spring 56 to fall into a suitable receiver or chute 57.

In operating the machine, an operative stands at about X (see Fig. 3) and from a pile 58 of blocks 1 places them in the machine against the inner side of the guide 12 whenever he sees a block lacking. Guide wall 12 is formed with a spring leaf at 12' which will open to permit insertion of blocks on edge in direction of the arrow.

When the oval guide way is filled with good size blocks 1 the operative will have plenty of time to go to receptacle 10, if it be a box, and remove the product from time to time.

For small plants where a large output of muntings does not warrant the complete machine the oval guide way and its table may be detached so that the munting sticks may be fed to the horizontal saw directly between rollers 31 and 33, but this of course cuts down the capacity and keeps a man busy all the time on this machine as he will have to constantly reach over the saw to bring back the upper piece of each block until it is all sawed up.

To secure a clean cut through the blocks the saw blade extends beyond the wall 30 of the saw table and into a wooden block 58' mounted for vertical adjustment across a gap in the wall at this point. The vertical adjustment of this block is indicated at 59 in Fig. 5.

In considering the invention it will be seen that the machine may be quickly secured to an ordinary sticker, the saw table raised or lowered to align with the sticker table or guide, and the machine is ready to run.

Feed roller 48 is not absolutely necessary though it helps urge the blocks around the oval-shaped guide. This roll may be driven by any convenient source of power not shown. It is particularly useful when a block or two are used up leaving a gap, as then the operative need only push a new block into rollers 48—49.

Attention is called to the fact that the oval-shaped guide may be round, if desired, but it takes up more room, also it may have continuous double walls between which the blocks pass as shown by the plate 47, though if properly constructed and adjusted to the lengths of the blocks being operated on the blocks travel around the oval path without difficulty.

Having thus described our invention, what we claim is:

1. Wood working machinery comprising in combination with a sticker, a guide adapted to guide munting blanks toward said sticker, a saw operatively mounted in relation to said guide for sawing off a strip from said blank for passage along said guide to the sticker, and means to insure a guided return of the remainder of said blank back to the guide and to sawing position for repassage past the saw in repetition for cutting off successive strips therefrom.

2. Wood working machinery comprising in combination with a sticker, a guide adapted to guide munting blanks toward said sticker, a saw operatively mounted in relation to said guide for sawing off a strip from said blank for passage along said guide to the sticker, means to insure a guided return of the remainder of said blank back to the guide and to sawing position for repassage past the saw in repetition for cutting off successive strips therefrom, and means diverting waste strips from the path of travel of the blanks to prevent the waste strips from entering the sticker.

3. In wood working machinery comprising the combination with a sticker, of means adapted to direct vertically disposed wooden blanks toward said sticker, a horizontally disposed saw arranged to cut off strips from the lower edges of said blanks for passage to the sticker, and a guide forming a closed path of travel arranged and adapted for guiding the remainders of said blanks in vertical position back to sawing position for repassage past said saw.

4. In wood working machinery comprising the combination with a sticker, of means adapted to direct vertically disposed wooden blanks toward said sticker, a horizontally disposed saw arranged to cut off strips from the lower edges of said blanks for passage to the sticker, and a guide forming a closed path of travel arranged and adapted for guiding the remainders of said blanks in vertical position back to sawing position for repassage past said saw, said guide comprising a substantially horizontal track portion on which the blanks are supported and a vertical wall sustaining the blanks in vertical position.

5. In wood working machinery comprising the combination with a sticker, of means adapted to direct vertically disposed wooden blanks toward said sticker, a horizontally disposed saw arranged to cut off strips from the lower edges of said blanks for passage to the sticker, a guide forming a closed path of travel arranged and adapted for guiding the remainders of said blanks in vertical position back to sawing position for repassage past said saw, said guide comprising a substantiallly horizontal track portion on which the blanks are supported and a vertical wall sustaining the blanks in vertical position, and means for adjusting the length of said guide.

6. In wood working machinery comprising the combination with a sticker, of means adapted to direct vertically disposed wooden blanks toward said sticker, a horizontally disposed saw arranged to cut off strips from the lower edges of said blanks for passage to the sticker, a guide forming a closed path of travel arranged and adapted for guiding the remainders of said blanks in vertical position back to sawing position for repassage past said saw, said guide comprising a substantially horizontal track portion on which the blanks are supported and a vertical wall sustaining the blanks in vertical position, and stationary means resiliently pressing the blanks against said wall.

7. In a structure as specified in claim 4, said guide being substantially oval shape in plan, and said wall being around the outer side of said guide.

8. In a structure as specified in claim 4, said guide being substantially oval shape in plan, said wall being around the outer side of said guide, and the guide and its wall formed in sections adjustable in relation to each other for changing the length of the guide.

9. In a structure as specified in claim 4, means for raising and lowering the guide for aligning with the sticker.

10. In a structure as specified in claim 3, means for forcing the blanks along said guide past said saw.

11. In a structure as specified in claim 3, means adjacent said saw for forcing the blanks along said guide past said saw, and means at another point along said guide for forcing the blanks therealong.

WILLIAM H. KING.
ALVA HUFFMAN.